United States Patent
Jiang et al.

(10) Patent No.: US 9,664,936 B2
(45) Date of Patent: May 30, 2017

(54) DISPLAY PANEL MOTHERBOARD, DISPLAY PANEL, MANUFACTURING METHOD THEREOF AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Ni Jiang, Beijing (CN); Kun Li, Beijing (CN); Xi Xiang, Beijing (CN); Yuanming Feng, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 42 days.

(21) Appl. No.: 14/786,017

(22) PCT Filed: Mar. 23, 2015

(86) PCT No.: PCT/CN2015/074895
§ 371 (c)(1),
(2) Date: Oct. 21, 2015

(87) PCT Pub. No.: WO2016/065818
PCT Pub. Date: May 6, 2016

(65) Prior Publication Data
US 2016/0357057 A1  Dec. 8, 2016

(30) Foreign Application Priority Data

Oct. 30, 2014  (CN) .......................... 2014 1 0601910

(51) Int. Cl.
*G02F 1/1333* (2006.01)
*G02F 1/1335* (2006.01)
(Continued)

(52) U.S. Cl.
CPC ...... *G02F 1/133351* (2013.01); *G02F 1/1341* (2013.01); *G02F 1/133512* (2013.01);
(Continued)

(58) Field of Classification Search
CPC ............. G02F 1/133351; G02F 1/1339; G02F 1/133512; G02F 1/133514; G02F 1/13394;
(Continued)

(56) References Cited

U.S. PATENT DOCUMENTS

2003/0117573 A1\* 6/2003 Yi .......................... G02F 1/1333
349/158
2008/0158482 A1 7/2008 Jang et al.
2009/0185101 A1 7/2009 Matsuhira et al.

FOREIGN PATENT DOCUMENTS

CN  101236336 A  8/2008
CN  101533174 A  9/2009
(Continued)

OTHER PUBLICATIONS

First Chinese Office Action dated Oct. 18, 2016; Appln. No. 201410601910.5.
(Continued)

*Primary Examiner* — Charles Chang
(74) *Attorney, Agent, or Firm* — Ladas & Parry LLP

(57) ABSTRACT

A display panel motherboard, a display panel, a manufacturing method thereof and a display device are provided. The display panel motherboard includes an array substrate provided with a metal lead layer and an protection layer and an opposing substrate provided with a black matrix layer;
(Continued)

alignment rulers are respectively disposed in portions of the metal lead layer and the black matrix layer, corresponding to a sealant region; a protrusion is formed in a portion of the protection layer corresponding to the alignment ruler in the metal lead layer, in a thickness direction; and/or the opposing substrate further comprises a spacer layer, and a protrusion is formed in a portion of the spacer layer corresponding to the alignment ruler in the black matrix layer in the thickness direction.

13 Claims, 4 Drawing Sheets

(51) Int. Cl.
  *G02F 1/1341* (2006.01)
  *G02F 1/1339* (2006.01)
(52) U.S. Cl.
  CPC ...... *G02F 1/133514* (2013.01); *G02F 1/1339* (2013.01); *G02F 1/13394* (2013.01); *G02F 1/133345* (2013.01); *G02F 2001/13415* (2013.01); *G02F 2001/133354* (2013.01)

(58) Field of Classification Search
  CPC ....... G02F 1/1341; G02F 2001/133354; G02F 2001/13415; G02F 1/133345
  USPC .......................................................... 349/158
  See application file for complete search history.

(56) References Cited

FOREIGN PATENT DOCUMENTS

| | | |
|---|---|---|
| CN | 103149743 A | 6/2013 |
| CN | 103207480 A | 7/2013 |
| CN | 103278970 A | 9/2013 |
| CN | 203535599 U | 4/2014 |
| CN | 104297979 A | 1/2015 |
| CN | 104330912 A | 2/2015 |
| JP | 2001-083490 A | 3/2001 |
| JP | 2005-115037 A | 4/2005 |

OTHER PUBLICATIONS

International Search Report mailed Jul. 22, 2015, and Written Opinion of the International Searching Authority mailed Jul. 21, 2015; PCT/CN2015/074895.

* cited by examiner

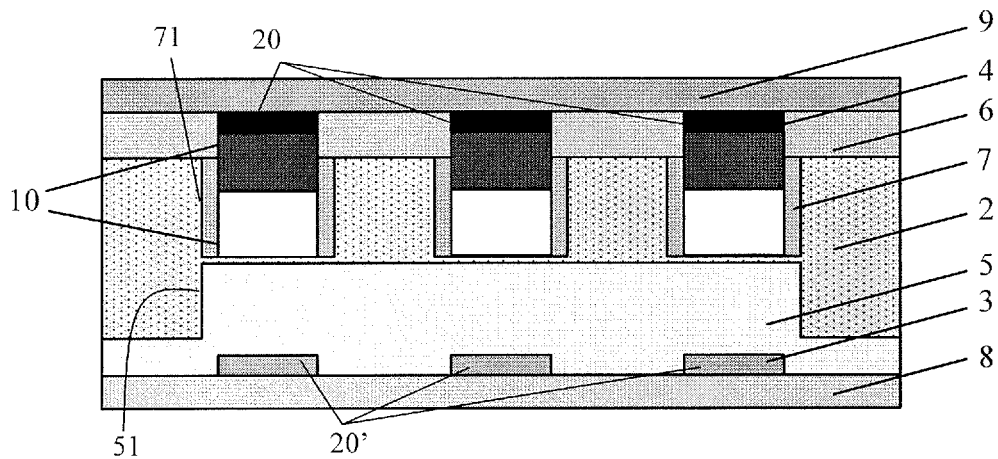

FIG. 8 forming a metal lead layer on an array substrate, forming an alignment ruler in a portion of the metal lead layer corresponding to a sealant region, and forming an protection layer on the metal lead layer

↓ forming a black matrix layer on an opposing substrate, and forming an alignment ruler in a portion of the black matrix layer corresponding to the sealant region, a spacer layer is formed above the black matrix layer, and a protrusion is formed in a portion of the protection layer corresponding to the alignment ruler in the metal lead layer, in a cell-assembly direction; and/or a protrusion is formed in a portion of the spacer layer corresponding to the alignment ruler in the black matrix layer, in the cell-assembly direction

FIG. 9

DISPLAY PANEL MOTHERBOARD, DISPLAY PANEL, MANUFACTURING METHOD THEREOF AND DISPLAY DEVICE

BACKGROUND

At least one embodiment of the present invention relates to a display panel motherboard, a display device, a display panel and a manufacturing method thereof.

SUMMARY

A thin-film transistor liquid crystal display (TFT-LCD) dominates the current display field and has been widely applied in modern digital information apparatuses due to the advantages such as small size, low power consumption, non-radiation and high resolution. With the rapid development of flat panel display technology, a narrow-frame product is favored by more and more consumers of all ages.

Cutting with sealant technology is an effective technical means in achieving the narrow-frame design of a liquid crystal display (LCD) panel and increasing an area of a display region and has now been applied by various panel manufacturers. In the cutting with sealant technology, single sealant is used to separate display regions of two adjacent panel units between the two adjacent panel units, and a cutting line of adjacent panels are positioned at a center line of the sealant.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 8 is a schematic structural view of a sealant region of a display panel motherboard provided by still another embodiment of the present invention; and FIG. 9 is a flowchart of a method for manufacturing a display panel, provided by one embodiment of the present invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
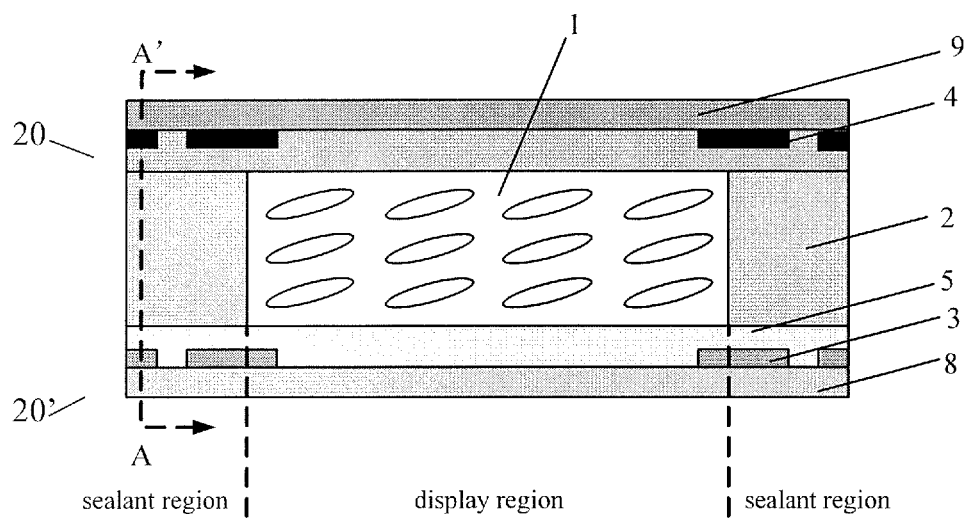
FIG. 1 is a schematic structural view of a display panel.
Figure 2:
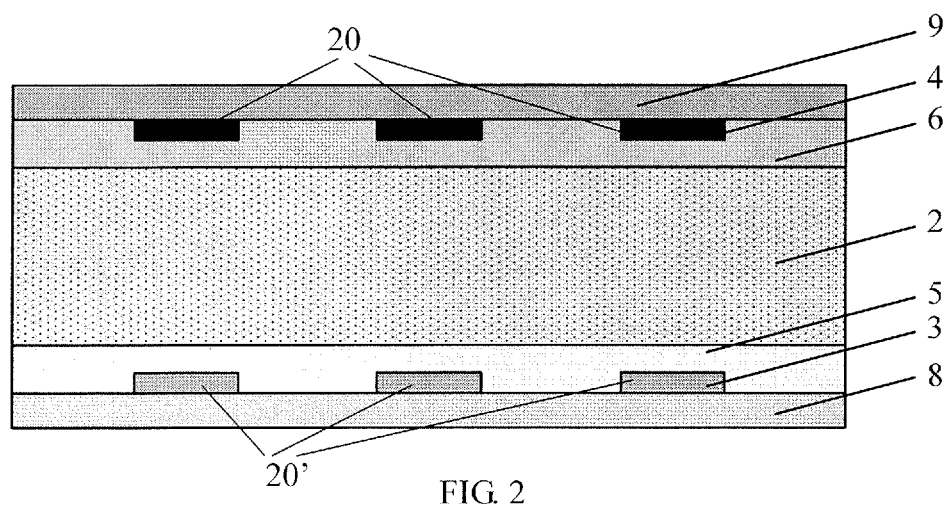
FIG. 2 is a schematic cross-sectional view of cutting the display panel in FIG. 1 along A-A' direction.

In the study, the inventors of the application has noted that: in the cutting with sealant technology, a sealant is coated on a cutting line; and as illustrated in FIG. 1, sealant regions are disposed on both sides of a display region of a display panel after cutting. In the display region, liquid crystal 1 is filled between a color filter substrate and an array substrate; in the sealant regions, a sealant 2 is filled between the color filter substrate and the array substrate, wherein, alignment rulers 20 and 20' are respectively disposed in a black matrix layer 4 and a metal lead layer 3. A cross-section of the sealant region is as shown in FIG. 2; a protection layer 5 may be disposed on the metal lead layer 3; and one layer of thick sealant is disposed on the protection layer 5, namely the alignment ruler disposed near the cutting line are covered by the sealant 2. Although the protection layer 5 is light-transmitting, the transmittance of the sealant 2 is very low. When a display panel motherboard is cut by an apparatus, the alignment ruler below the sealant 2 can be difficulty identified, and hence accurate cutting can be difficulty achieved.

At least one embodiment of the present invention provides a display panel motherboard, which comprises an array substrate 8 and an opposing substrate (e.g., a color filter substrate 9 as shown in FIGS. 3a to 8). The array substrate 8 includes a metal lead layer 3 and a protection layer 5; the opposing substrate includes a black matrix layer 4; and alignment rulers 20' and 20 are respectively disposed in portions of the metal lead layer 3 and the black matrix layer 4 corresponding to a sealant region. In the display panel motherboard, the protection layer 5 is provided with a protrusion 51 in a portion of the protection layer 5 corresponding to the alignment ruler in the metal lead layer 3, in a thickness direction (a direction perpendicular to the array substrate 8); and/or the opposing substrate may further include a spacer layer 7, and the spacer layer 7 is provided with a protrusion 71 in a portion of the spacer layer 7 corresponding to the alignment ruler in the black matrix layer 4, in the thickness direction (the direction perpendicular to the array substrate 8).

It should be noted that the protrusion 51 provided to the protection layer 5 is convex towards the sealant 2 from a surface of the protection layer 5 and the protrusion 71 provided to the spacer layer 7 is convex towards the sealant 2 from a surface of the spacer layer 7.

Both the protection layer 5 and the spacer layer 7 may be directly connected with the sealant 2. For instance, when the spacer layer 7 is disposed in the sealant region of the display panel motherboard, the protection layer 5 and the spacer layer 7 are connected with each other through the sealant 2.

The opposing substrate and the array substrate are arranged opposite to each other, and the liquid crystal 1 may be disposed between the opposing substrate and the array substrate. The opposing substrate may be a color filter substrate. Of course, the opposing substrate may also be other substrate except the color filter substrate, e.g., a transparent substrate.

Figure 3A:
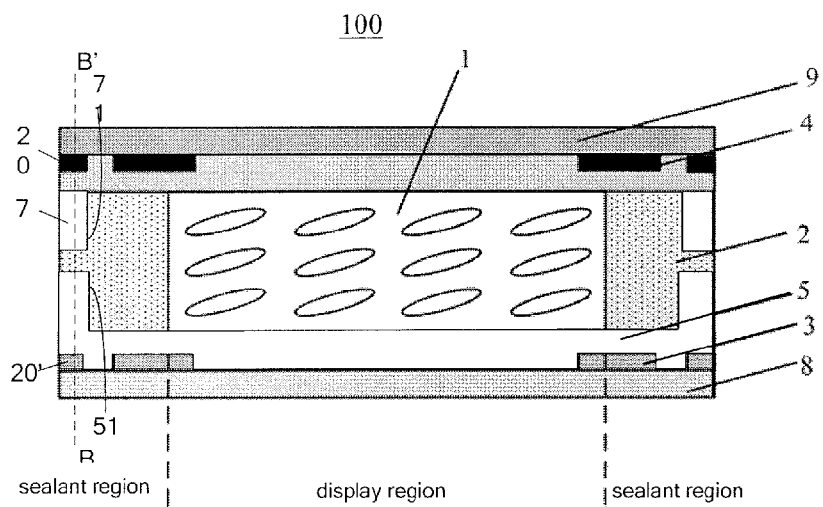
FIG. 3a is a schematic structural view of a display panel unit of a display panel motherboard provided by one embodiment of the present invention.
Figure 3B:
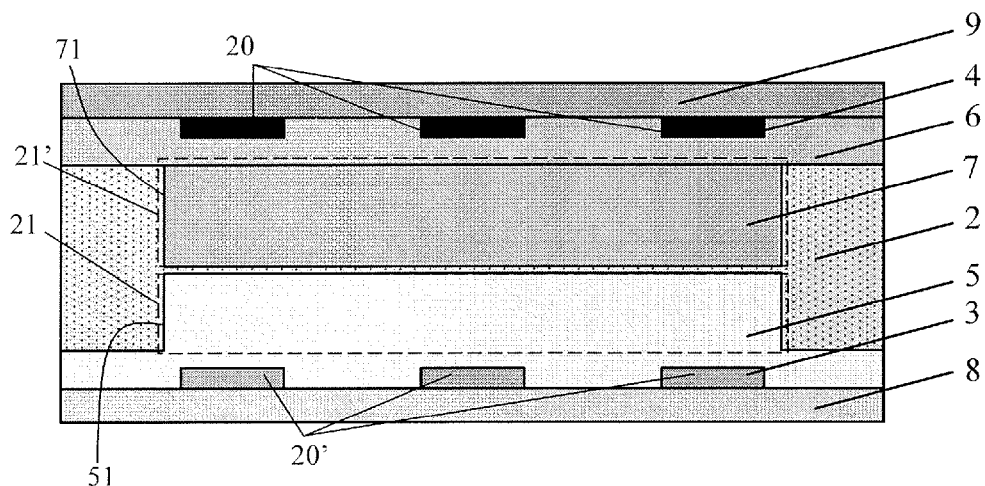
FIG. 3b is a schematic structural view of a sealant region of a display panel motherboard provided by one embodiment of the present invention.

The alignment ruler 20 in the black matrix layer 4 may be made from a material for forming the black matrix layer 4. FIG. 3b is a schematic cross-sectional view of a display panel unit in FIG. 3a cutting along the B-B' direction. As illustrated in FIGS. 3a and 3b, the alignment ruler 20 in the black matrix layer 4 is disposed at an edge of a display panel unit 100 of the display panel motherboard. For instance, a plurality of strip structures spaced from each other with an interval may be formed at the edge of the display panel unit 100 by utilization of the material for forming the black matrix layer 4; the strip structures constitutes the alignment ruler 20; and each strip structure may be taken as a scale of the alignment ruler 20. Similarly, the alignment ruler 20' in the metal lead layer 3 may be made from a material for forming the metal lead layer 3.

As illustrated in FIGS. 3b to 8, a layer in which the alignment ruler 20 is positioned is the black matrix layer 4, and a layer in which the alignment ruler 20' is positioned is the metal lead layer 3.

According to one embodiment of the present invention, a structure of the sealant region of the display panel motherboard may be as shown in FIG. 3b, wherein the alignment ruler may be disposed in the metal lead layer 3 and the black matrix layer 4. The alignment ruler 20 is made from different materials according to the position thereof. For instance, the alignment ruler disposed in the metal lead layer 3 may be made from a metal or an alloy.

As the protection layer 5 and/or the spacer layer 7 in the sealant region are provided with the protrusions in a thickness direction of the alignment ruler (for instance, a height of the protrusion may be determined by a thickness of the display panel motherboard), a gap between the protection layer 5 and the spacer layer 7 can be reduced. As the sealant is extruded during cell-assembling, the amount of the sealant 2 filled between the protection layer 5 and the spacer layer 7 in the thickness direction of the alignment ruler (or corresponding to the protection layer or the spacer layer) is reduced, so that the formed sealant layer is thinner, and hence the light-shielding degree on the alignment rulers in the metal lead layer 3 and the black matrix layer 4 is lower as well. When the array substrate and the opposing substrate are cell-assembled according to the alignment rulers in the array substrate and the opposing substrate, the alignment rulers on the two substrates can be easily identified, and hence the cell-assembly accuracy of the two substrates can be determined by the position relationship of the alignment rulers.

As at least one of the protection layer 5 and the spacer layer 7 in the sealant region is provided with the protrusion, a recessed portion is formed in the sealant at positions corresponding to the alignment rulers. As illustrated in FIG. 3b, when the sealant 2 is adjacent to the protection layer 5 and the spacer layer 7, shapes of recessed portions 21 and 21' (as shown by dotted lines) are respectively matched with shapes of the protrusions 51 and 71.

In addition, as the sealant 2 between the protection layer 5 and the spacer layer 7 is thinner, a cutting apparatus can identify the alignment ruler on the other side of the display panel motherboard through the sealant 2 between the protection layer 5 and the spacer layer 7, on one side of the display panel motherboard during cutting with sealant in the sealant region, and hence executes accurate cutting operation in the sealant region according to the alignment ruler.

The connection between the protection layer 5 and the spacer layer 7 may be direct connection via the sealant and may also be indirect connection (namely another layer structure may also be additionally disposed between the protection layer and the spacer layer).

Figure 5:
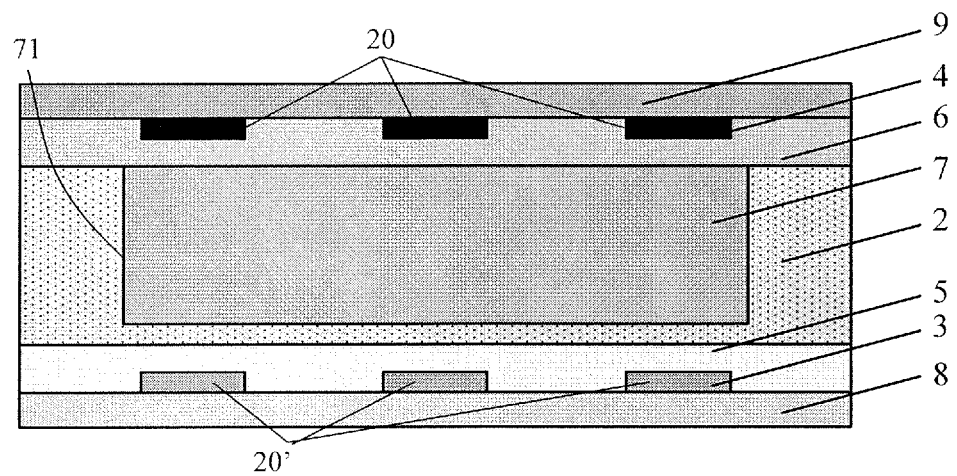
FIG. 5 is a schematic structural view of a sealant region of a display panel motherboard provided by still another embodiment of the present invention.

As illustrated in FIG. 5, if a thickness of the protection layer 5 on the array substrate is smaller, a thickness of the spacer layer 7 on the color filter substrate may be increased, so that the thickness of the spacer layer 7 is greater than a predetermined value, and hence the amount of the sealant 2 filled between the spacer layer 7 and the protection layer 5 can also be guaranteed to be small and the formed sealant layer can be thinner. Therefore, the cutting apparatus is guaranteed to be able to accurately identify the alignment rulers through the sealant 2 in the case of cutting the display panel motherboard. The predetermined value is a thickness of a portion of the spacer layer 7 in the sealant region when the protrusion 71 is not formed. The predetermined value may be determined according to a thickness of the display panel motherboard and the penetration capacity of a cell-assembly calibration apparatus. When the motherboard is thinner and the penetration capacity of the cell-assembly calibration apparatus is stronger, the predetermined value may be smaller, so that the amount of the sealant between the spacer layer 7 and the protection layer 5 is relatively large, and hence the adhesive effect of the sealant can be guaranteed.

Figure 6:
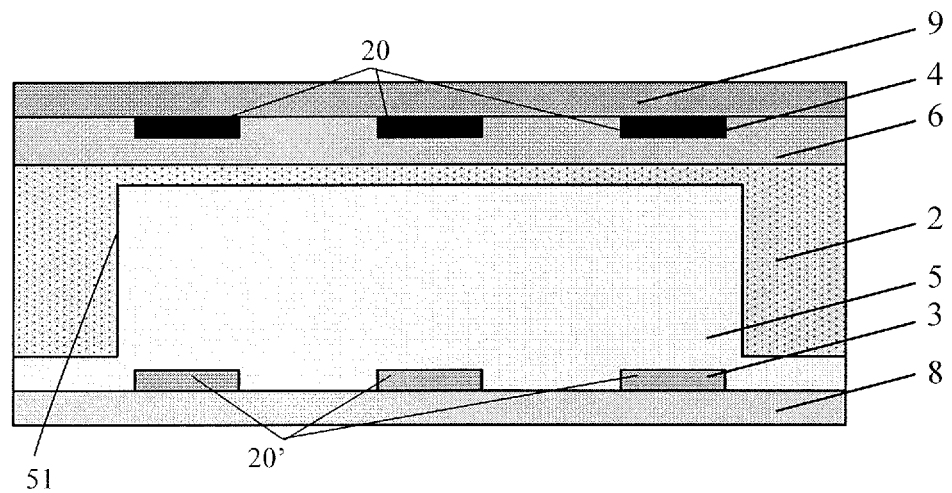
FIG. 6 is a schematic structural view of a sealant region of a display panel motherboard provided by still another embodiment of the present invention.

As illustrated in FIG. 6, if the spacer layer 7 is not disposed in the sealant region of the display panel motherboard (or the spacer layer 7 is thinner), the thickness of the protection layer 5 may be increased, so that the thickness of the protection layer 5 is greater than a predetermined value (namely the thickness of a portion of the protection layer 5 in the sealant region when the protrusion 51 is not formed), and hence a gap between the protection layer 5 and a planarization layer 6 is relatively smaller. Thus, the amount of the sealant 2 filled between the protection layer and the planarization layer is small and the formed sealant layer is thinner, so that the sealant 2 will not produce large refractive index, and hence the cutting apparatus is guaranteed to be able to accurately identify the alignment rulers through the sealant 2 in the case of cutting the display panel motherboard.

Figure 7:
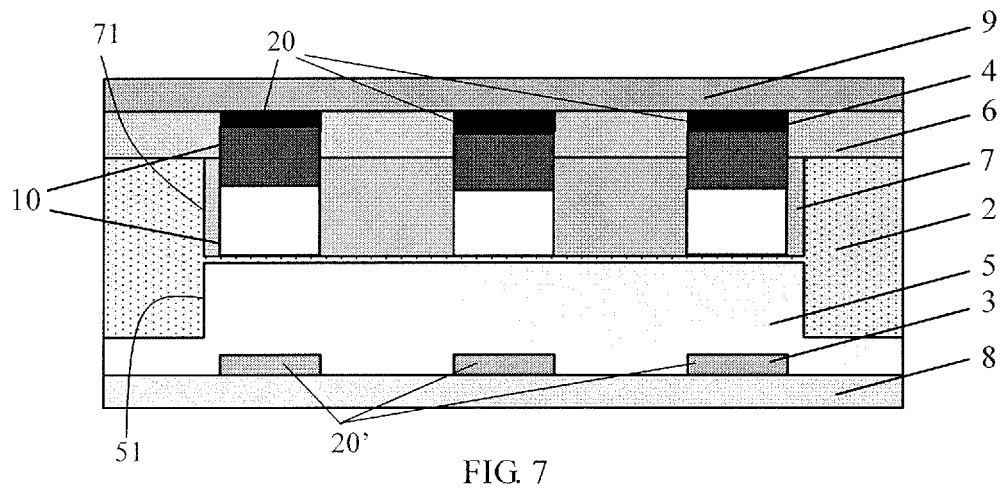
FIG. 7 is a schematic structural view of a sealant region of a display panel motherboard provided by still another embodiment of the present invention.

As illustrated in FIGS. 7 and 8, for instance, a color filter layer 10 is formed on the alignment ruler of the black matrix layer 4 in the sealant region and is as one part of the spacer layer 7. The color filter layer 10 and a color filter layer in a pixel region may be formed simultaneously; subsequently, a general spacer layer is arranged; and hence the spacer layer includes the color filter layer.

For instance, the color filter layer 10 is disposed at positions corresponding to the black matrix layer 4. For instance, a width of the color filter layer 10 is same with that of the alignment ruler 20 in the black matrix layer 4 along a direction parallel to the opposing substrate. The arrangement can prevent the opaque color filter layer from affecting the identification of the alignment ruler.

For instance, the color filter layer 10 includes one or more layers selected from a red filter layer, a green filter layer and a blue filter layer. Description is given in FIGS. 7 and 8 by taking a case that the color filter layer 10 includes two color filter layers as an example.

For instance, the color filter substrate further includes a planarization layer 6 disposed on the black matrix layer, so as to form a flat layer structure for the convenience of placing the spacer layer.

In general, the array substrate further includes structures such as a transparent pixel electrode layer and a transparent common electrode layer. As the structures are irrelevant to the improvement of the embodiment of the present invention, no detailed description will be given here.

Figure 4:
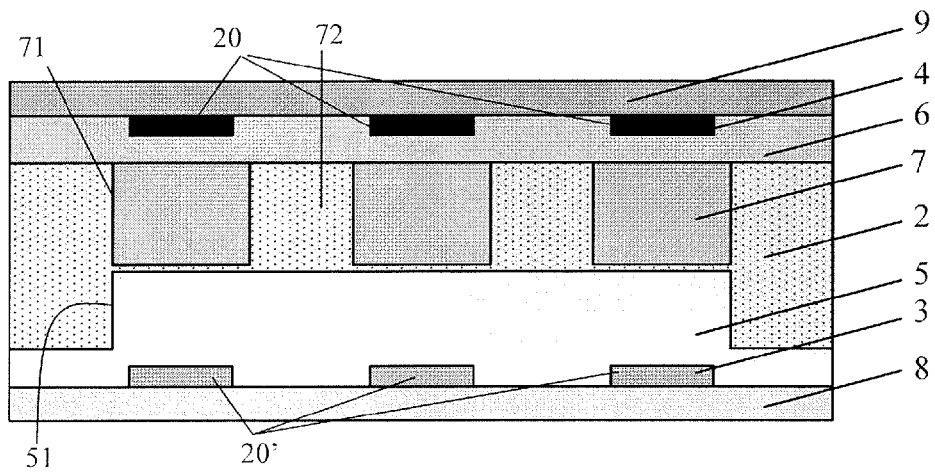
FIG. 4 is a schematic structural view of a sealant region of a display panel motherboard provided by another embodiment of the present invention.

As illustrated in FIG. 4, in at least one embodiment, the protrusion 71 of the spacer layer 7 may be one protrusion or more than one protrusions, and a recess 72 for accommodating the sealant is formed between more than one protrusions. For instance, the protrusion 71 of the spacer layer 7 may be a plurality of discontinuous protrusions (may be completely discontinuous or bottoms of the protrusions are connected with each other and tops of the protrusions are arranged to space from each other with an interval), and each protrusion corresponds to the black matrix layer. For instance, a width of each protrusion is greater than that of the alignment ruler formed in the black matrix layer along the direction parallel to the array substrate. The discontinuously arranged protrusions in the spacer layer may be obtained by arranging a spacer mask. The sealant is still filled between adjacent protrusions (namely in the recess 72), so that the degree of adhesion between the color filter substrate and the array substrate can also be guaranteed while accurate calibration and accurate cutting are guaranteed.

At least one embodiment of the present invention further provides a display panel, which is obtained by performing the cutting with sealant to any foregoing display panel motherboard.

As the display panel provided by the embodiment of the present invention is obtained by cutting the display panel motherboard provided by any foregoing embodiment, the structure of the display panel is, for instance, as shown by the single display panel unit 100 of the display panel motherboard as illustrated in FIG. 3*a*. Moreover, the embodiments of the display panel may refer to the above description. No further description will be given here.

At least one embodiment of the present invention further provides a display device, which comprises any foregoing display panel.

As illustrated in FIG. 9, at least one embodiment of the present invention further provides a method for manufacturing a display panel. The method comprises: forming a metal lead layer 3 on an array substrate 8, forming an alignment ruler in a portion of the metal lead layer 3 corresponding to a sealant region, and forming an protection layer 5 on the metal lead layer 3; and forming a black matrix layer 4 on an opposing substrate (e.g., a color filter substrate 9) and forming an alignment ruler in a portion of the black matrix layer 4 corresponding to the sealant region. In the method, a protrusion is formed in a portion of the protection layer 5 corresponding to the alignment ruler in the metal lead layer 3, in the cell-assembly direction; and/or a spacer layer 7 is formed above the black matrix layer 4 and a protrusion is formed in a portion of the spacer layer 7 corresponding to the alignment ruler in the black matrix layer 4, in the cell-assembly direction.

For instance, the step of forming the spacer layer 7 above the black matrix layer 4 includes: forming a planarization layer on the black matrix layer 4 and forming the spacer layer 7 on the planarization layer.

For instance, the manufacturing method may further comprise: dripping liquid crystal in a display region of the array substrate, coating a sealant in the sealant region of the opposing substrate, and cell-assembling the opposing substrate and the array substrate; and performing alignment calibration and cutting according to the alignment rulers in the metal lead layer and the black matrix layer.

It should be noted that the display device provided by the embodiment may be: any product or component with display function such as e-paper, a mobile phone, a tablet computer, a television, a notebook computer, a digital picture frame and a navigator.

In the accompanying drawings, the size of the layers and the regions may be magnified for clear illustration. Moreover, it can be understood that: when an element or layer is referred to be disposed "on" another element or layer, the element or layer may be directly disposed on the other element, or an intermediate layer may be arranged. In addition, it can be understood that: when an element or layer is referred to be disposed "beneath" another element or layer, the element or layer may be directly disposed on the other element, or more than one intermediate layers or elements may be arranged. Moreover, it can be also understood that: when a layer or element is referred to be disposed "between" two layers or elements, the layer or element may be a unique layer between the two layers or elements, or more than one intermediate layers or elements may also be arranged. Similar reference numerals in the whole text refer to similar elements.

In the embodiment of the present invention, unless otherwise definitely limited, the term "a plurality of" refers to two or more than two.

By adoption of the above technical solution, the metal lead layer, the black matrix layer, the protection layer and the spacer layer may be formed in the sealant region of the display panel motherboard; the alignment rulers are respectively disposed in the metal lead layer and the black matrix layer in the sealant region; a sum of thicknesses of the protection layer and the spacer layer in the sealant region is set to be greater than a predetermined value (the predetermined value is the sum of the thicknesses of the protection layer and the spacer layer when the protrusion is not formed); and the sealant is extruded during vacuum cell-assembling. Therefore, the amount of the sealant between the protection layer and the spacer layer in the sealant region is small; the light-shielding degree on the alignment ruler in the black matrix layer and the metal lead layer is low; alignment calibration can be conveniently performed according to the alignment rulers in the black matrix layer and the metal lead layer; the identification accuracy will not be affected when the cutting apparatus identifies the alignment rulers in the metal lead layer and the black matrix layer; and hence the cutting apparatus can be guaranteed to be able to accurately cut the display panel motherboard to obtain the display panel.

The foregoing is only the preferred embodiments of the present invention and not intended to limit the scope of protection of the present invention. The scope of protection of the present invention should be defined by the appended claims.

The application claims priority to the Chinese patent application No. 201410601910.5 filed on Oct. 30, 2014, the disclosure of which is incorporated herein by reference as part of the application.

What is claimed is:

1. A display panel motherboard, comprising an array substrate and an opposing substrate, wherein the array substrate comprises a metal lead layer and a protection layer, the opposing substrate comprises a black matrix layer;
   alignment rulers are respectively disposed in portions of the metal lead layer and the black matrix layer corresponding to a sealant region,
   wherein a protrusion is formed in a portion of the protection layer corresponding to the alignment ruler in the metal lead layer, in a thickness direction; and/or
   the opposing substrate further comprises a spacer layer, and a protrusion is formed in a portion of the spacer layer corresponding to the alignment ruler in the black matrix layer in the thickness direction.

2. The display panel motherboard according to claim 1, wherein a color filter layer is formed on alignment ruler portion of the black matrix layer in the sealant region and forms a part of the spacer layer.

3. The display panel motherboard according to claim 2, wherein the color filter layer comprises one or more layers selected from a red filter layer, a green filter layer and a blue filter layer.

4. The display panel motherboard according to claim 1, wherein a planarization layer is also formed above the black matrix layer of the opposing substrate.

5. The display panel motherboard according to claim 1, wherein the protrusion of the spacer layer includes one protrusion or more than one protrusions, and a recess for accommodating the sealant is formed between more than one protrusions.

6. The display panel motherboard according to claim 1, wherein the protection layer is directly connected with the sealant.

7. The display panel motherboard according to claim 1, wherein the spacer layer is directly connected with the sealant.

8. The display panel motherboard according to claim 6, wherein
a recessed portion is formed in the sealant at a position corresponding to the alignment ruler.

9. A display panel, which is obtained by cutting with sealant of the display panel motherboard according to claim 1.

10. A display device, comprising the display panel according to claim 9.

11. A method for manufacturing a display panel, comprising:
forming a metal lead layer on an array substrate, forming an alignment ruler in a portion of the metal lead layer corresponding to a sealant region, and forming a protection layer on the metal lead layer; and
forming a black matrix layer on an opposing substrate, and forming an alignment ruler in a portion of the black matrix layer corresponding to the sealant region,
wherein a protrusion is formed in a portion of the protection layer corresponding to the alignment ruler in the metal lead layer, in a cell-assembly direction; and/or
a spacer layer is formed above the black matrix layer, and a protrusion is formed in a portion of the spacer layer corresponding to the alignment ruler in the black matrix layer, in the cell-assembly direction.

12. The method for manufacturing the display panel according to claim 11, wherein a planarization layer is formed on the black matrix layer; and the spacer layer is formed on the planarization layer.

13. The method for manufacturing the display panel according to claim 11, further comprising:
dripping liquid crystal in a display region of the array substrate, coating a sealant at the sealant region of the opposing substrate, and cell-assembling the opposing substrate and the array substrate; and
performing alignment calibration and cutting according to the alignment rulers in the metal lead layer and the black matrix layer.

* * * * *